United States Patent [19]

McKee et al.

[11] Patent Number: 5,032,752

[45] Date of Patent: Jul. 16, 1991

[54] ANISOTROPIC RESISTIVITY MATERIAL AND METHOD OF MAKING SAME

[75] Inventors: Bobby D. McKee, San Jose; Alvin H. Nakagawa, Campbell, both of Calif.

[73] Assignee: Westinghouse Electric Corp., Pittsburgh, Pa.

[21] Appl. No.: 531,275

[22] Filed: May 31, 1990

Related U.S. Application Data

[62] Division of Ser. No. 284,881, Dec. 15, 1988, Pat. No. 4,940,878.

[51] Int. Cl.$^5$ .............................................. H02K 1/22
[52] U.S. Cl. .............................. 310/261; 219/121.14; 219/121.64; 338/334
[58] Field of Search ...................... 219/121.13, 121.14, 219/121.63, 121.64; 338/314, 334; 29/610.1; 228/125, 160, 161; 310/261, 72

[56] References Cited

U.S. PATENT DOCUMENTS 4,468,552  8/1984  Morley .................... 219/121.14 X
4,751,417  6/1988  Krinickas, Jr. et al. ............ 310/261

Primary Examiner—C. L. Albritton
Attorney, Agent, or Firm—D. Schron

[57] ABSTRACT

A material which exhibits different electrical resistivity in mutually perpendicular directions is formed by providing a base member of one metal and covering a surface of the base member with a second metal of a different composition. Thereafter, multiple passes are made with a high energy beam over the surface of the second metal to form a plurality of alloyed zones in the base metal with the resistivity of the alloyed zones being different than that of the adjacent base metal.

A rotor for a dynamoelectric machine fabricated by such methods imparts a preferred direction to current flow to thereby eliminate large undesirable eddy currents and by tailoring the pattern of the higher resistivity zones, a machine may be provided which produces a self-compensating flux to minimize undesirable flux leakage common in such machines.

3 Claims, 4 Drawing Sheets

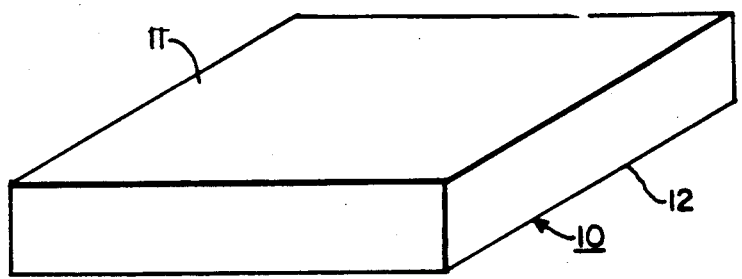
FIG. IA.
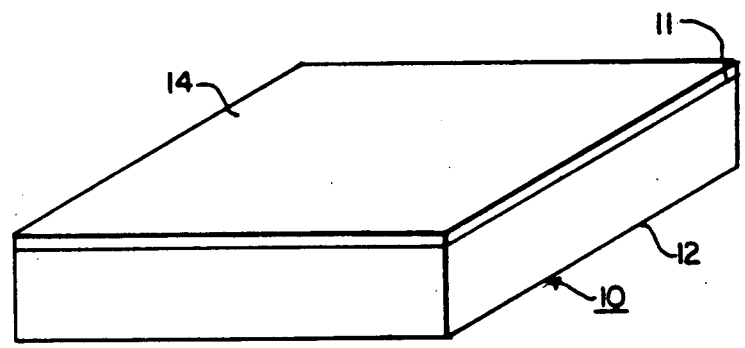
FIG. IB.
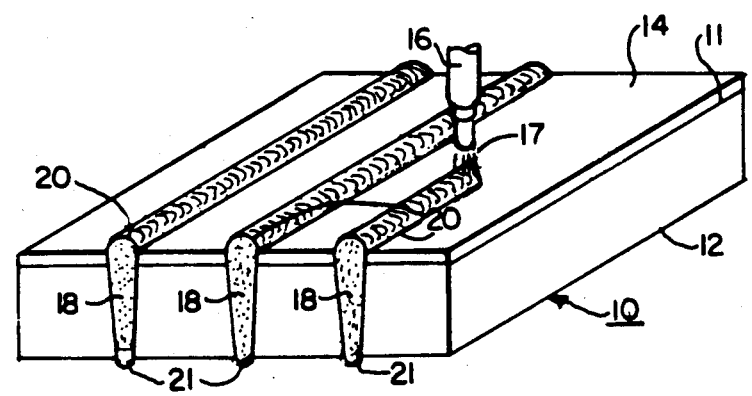
FIG. IC.
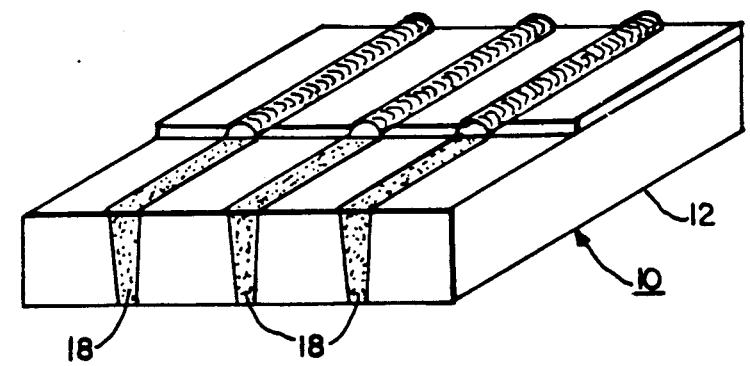
FIG. ID.
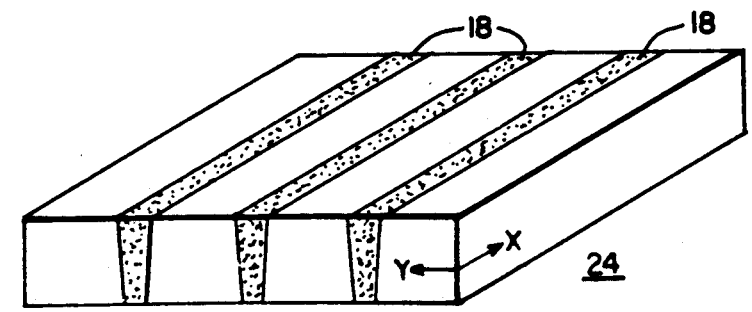
FIG. IE.

ANISOTROPIC RESISTIVITY MATERIAL AND METHOD OF MAKING SAME

This is a division of application Ser. No. 07/284,881 filed Dec. 15, 1988, now U.S. Pat. No. 4,940,878.

BACKGROUND OF THE INVENTION

1. Field of the Invention

The invention in general relates to anisotropic resistivity material, and particularly to electrical components made therefrom.

2. Background Information

In an anisotropic resistivity material, the electrical resistance as measured in a first predetermined direction is different than the electrical resistance measured in a direction perpendicular thereto.

In the development of high current electrical equipment, there are requirements to control the path of electrical conduction to minimize eddy currents during current transients. One technique to meet the requirements utilizes separate conductors such as wires, cables, or bus bars contiguous but suitably insulated from one another. One disadvantage of this technique is that each individual conductor may not be structurally strong enough for the intended purpose and accordingly, supplemental support structures have to be provided Additionally, some types of electrical apparatus incorporate high speed contacting sliding surfaces. For example, in homopolar generators the surface of a high speed rotor makes sliding contact with a current collector during some point in its operation. Under such circumstances, a continuous smooth rotor surface is imperative and extremely difficult, if not impossible, to achieve if separate conductors are utilized to construct the rotor in order to minimize eddy currents.

The present invention provides for an anisotropic resistivity material which may be fabricated and patterned to control the direction of electric current flow within an electrical conductor.

SUMMARY OF THE INVENTION

An anisotropic resistivity body of the present invention is made by providing a base member of a first metal having first and second surfaces. A second and different metal is placed on a first surface of the base member with the second metal having a different composition than the first metal. Multiple passes are made over the surface with a high energy beam having sufficient energy so as to cause an alloyed zone to penetrate into the base member from said first toward said second surface, and thereafter any excess metal on the surfaces of the base member is removed so as to form a body having alternate zones of different resistivity. In another embodiment, the second metal is also placed on the second surface and multiple passes are made by the high energy beam over both the first and second surfaces.

The body formed in accordance with the present invention may be part of an electrical device having a preferred current direction through the body, one example being, a rotor of a homopolar generator wherein the material may be utilized to not only reduce eddy currents in the rotor but may also be utilized to generate compensating magnetic fields during operation.

BRIEF DESCRIPTION OF THE DRAWINGS

FIGS. 1A to 1E illustrate the fabrication of anisotropic resistivity material in accordance with one embodiment of the present invention;

DESCRIPTION OF THE PREFERRED EMBODIMENT

Figure 2A:
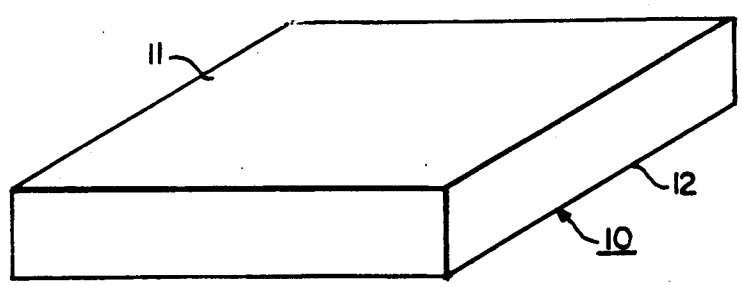
FIGS. 2A through 2E illustrate the fabrication of anisotropic resistivity material in another embodiment of the present invention.

FIGS. 1A through 1E illustrate the fabrication of an anisotropic resistivity body which may be used for the conduction of electricity.

In FIG. 1A a base member 10 is provided and by way of example is a high conductivity low resistivity conducting metal such as copper. The base member has first and second opposed surfaces 11 and 12 and as illustrated in FIG. 1B, a layer 14 of a second and different metal is placed on one of the surfaces The term "metal" as used herein means an elemental metal or an alloy. Layer 14 is of a metal which, when alloyed with copper, has a relatively lower conductivity and higher resistivity than copper, nickel being one example. Layer 14 may be placed on surface 11 such as by plating or cladding to a desired thickness, or a sheet of the second metal may be placed upon the surface and held in position such as by clamping.

As indicated in FIG. 1C, the next step in the process is the making of multiple passes over the surface by means of high energy beam apparatus 16. Apparatus 16 is operable to generate and project a high energy beam 17 with sufficient energy to penetrate layer 14 and base member 10 so as to form a plurality of alloyed zones 18 which extend from the first toward the second surface of base member 10. In the embodiment illustrated in FIG. 1C, the alloyed zones 18 extend completely through to surface 12. Each alloyed zone 18 is a copper nickel alloy which exhibits an overall lower conductivity and higher resistivity with respect to the copper base member 10.

The fabrication process produces excess beads 20 on the top surface and 21 on the bottom surface, which may be removed in a subsequent machining operation as illustrated in FIG. 1D. The excess material may be removed such as by milling or any other well know machining operation The resultant anisotropic resistivity body 24 is illustrated in FIG. 1E wherein the preferred current direction in the body would be in the direction of the x axis since the resistance in the x axis direction would be much less than that in the y axis direction due to the presence of the multiple high resistance alloyed zones 18.

The high energy beam 17 is provided by apparatus 16 which may be, for example, a laser or electron beam apparatus and in the embodiment of FIGS. 1A through 1E, the beam has sufficient energy to penetrate well into the base member 10. For lower energy beams, a fabrication technique such as illustrated in FIGS. 2A–2E may be utilized.

Figure 2B:
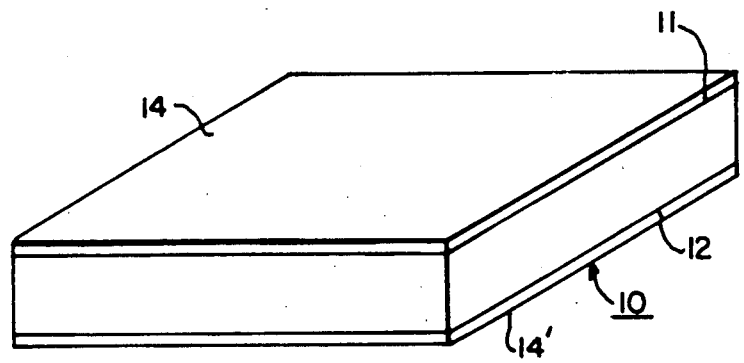

As illustrated in FIGS. 2A and 2B, in addition to metal layer 14 being placed upon surface 11, a second layer 14' of similar material is placed upon the second surface 12.

Figure 2C:
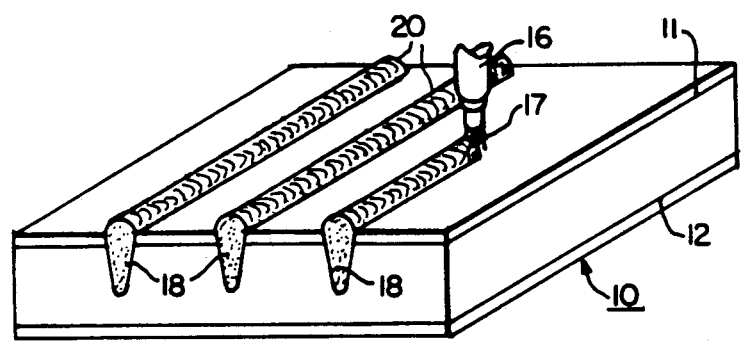

As illustrated in FIG. 2C, multiple passes are made with apparatus 16 which generates an energy beam 17 which does not have enough energy to penetrate through to the opposite surface but instead causes the formation of alloyed zones 18 which penetrate more than half way from surface 11 to surface 12.

Figure 2D:
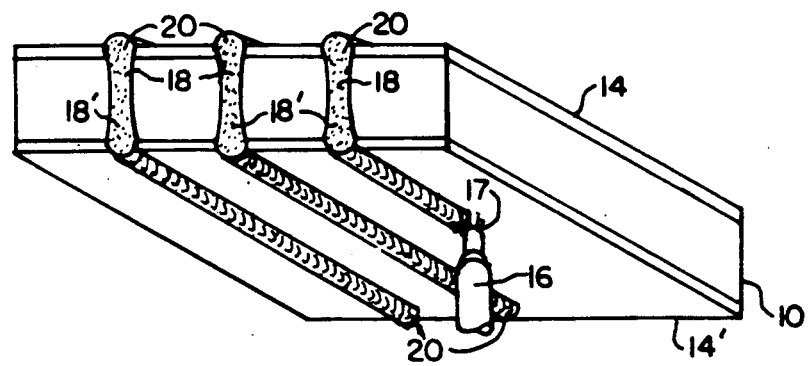
Figure 2E:
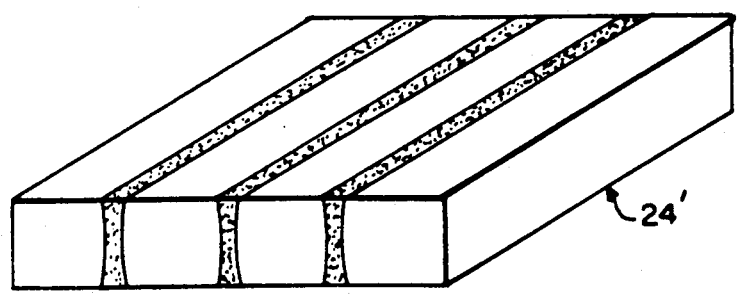

As illustrated in FIG. 2D, apparatus 16 is then caused to make multiple passes so as to cause the alloying of layer 14' with base member 10 so as to form multiple alloyed zones 18' which join with alloyed zones 18. Any excess beading 20 from the operation is then removed by machining, resulting in an anisotropic resistivity body 24' as illustrated in FIG. 2E and suitable for use as an electrical conductor wherein current flow is to be in a desired preferential direction.

Figure 3:
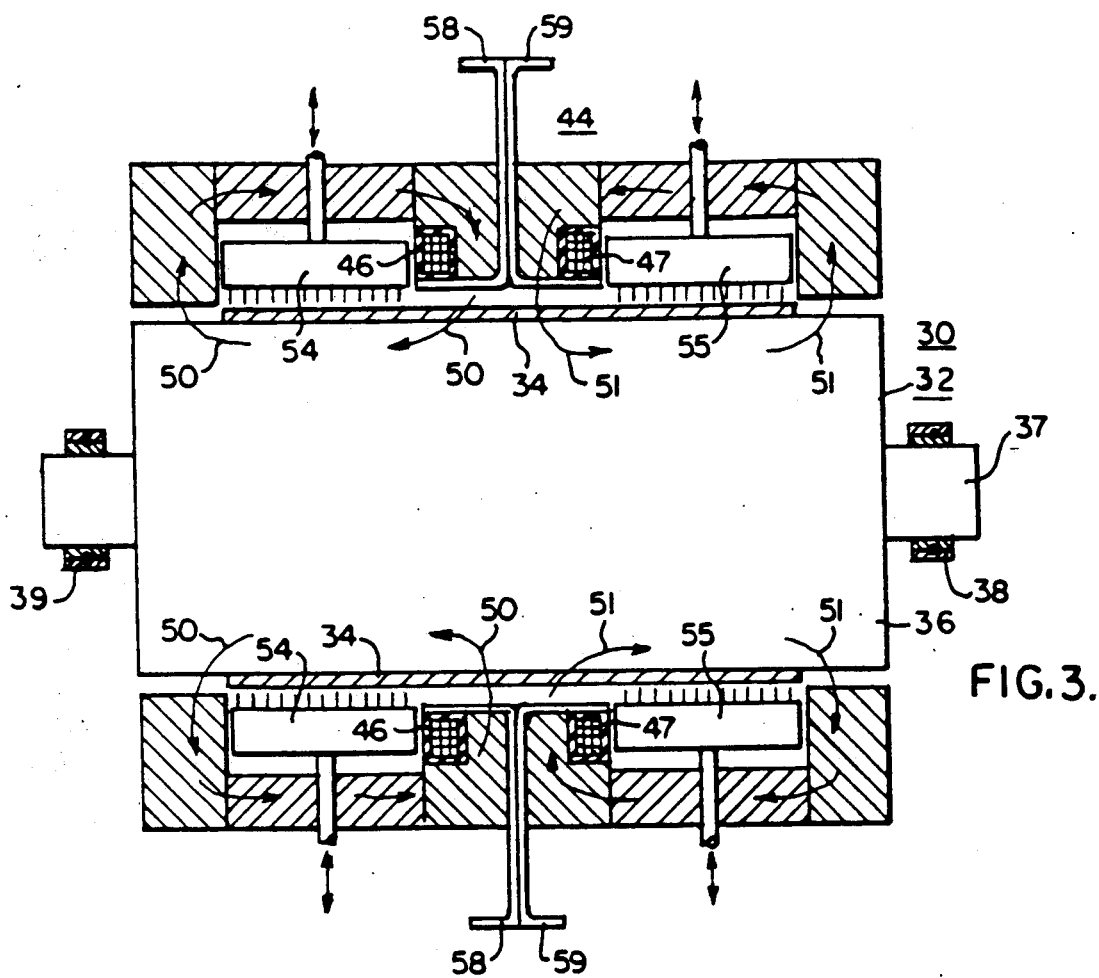
FIG. 3 is a simplified representation of a homopolar generator.

One type of apparatus in which the anisotropic resistivity material finds utility is dynamoelectric machines, and particularly, a homopolar generator, one simplified presentation of which is illustrated in FIG. 3.

The homopolar generator 30 includes a rotor structure 32 comprised of a thin cylindrical shell 34 of a highly conductive non-ferromagnetic material which is electrically insulated from and bonded or shrunk onto a ferromagnetic cylindrical core 36. Core 36 comprises the major portion of the rotor mass, which is directly connected to a drive shaft 37 supported by means of respective bearings 38 and 39.

Homopolar generator 30 includes a stator structure 44, which, in conjunction with main field coils 46 and 47 produces a magnetic flux which initially penetrates radially into the rotor 32 and is directed generally axially therein as indicated by arrows 50 and 51. Very basically, when this magnetic flux is cut by the rotor, a voltage is produced across the axial length of the rotor and when current collecting brush assemblies 54 and 55 make contact with the rotor, current is delivered at output terminals 58 and 59 connected to respective brush assemblies 54 and 55. Typically, brushes 54 and 55 may be held in a non-contacting position over the rotor until such time as a predetermined rotor speed has been achieved whereupon the brush assemblies may be mechanically dropped onto the rotor to make electrical contact therewith, more particularly with the conductive shell 34. During operation, current is confined to the cylindrical shell 34, however, such structure is subject to undesirable eddy currents which tend to reduce the current available at the output terminals 58 and 59 and in addition cause objectionable localized heating. The present invention may be utilized in the rotor structure of a dynamoelectric machine to minimize unwanted eddy currents.

Figure 4:
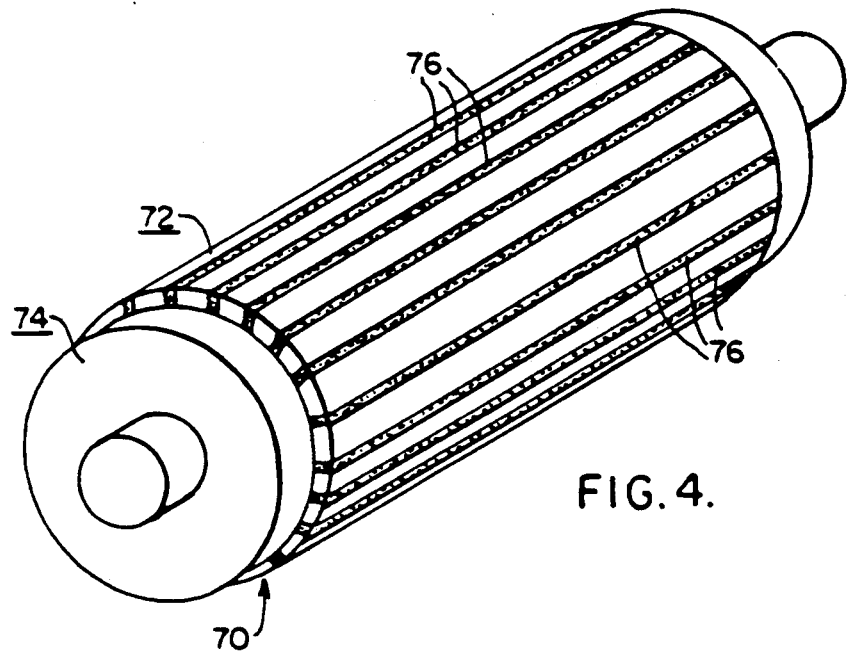
FIG. 4 illustrates one type of rotor arrangement which may be utilized in the homopolar generator of FIG. 3.

FIG. 4 illustrates the anisotropic resistivity material as would be applicable to a rotor 70 of a homopolar electric generator. The highly conductive cylindrical shell 72, electrically insulated from and bonded onto cylindrical core 74, is fabricated in accordance with the techniques illustrated in FIGS. 1A to 1E or 2A to 2E. The base member in such fabrication process would be a cylinder, preferably copper, and the second metal, such as nickel, would be applied so as to cover the surface thereof. After multiple passes are made with the high energy beam as described, a plurality of adjacent alloyed zones 76 result and which penetrate from the outer to the inner surface of the cylindrical shell 72. With such arrangement, current flow is predominately confined to an axial direction between the alloyed zones and large circulating eddy currents are minimized if not eliminated due to the higher resistivity in a circumferential direction as opposed to an axial direction along the cylindrical shell 72.

In view of the manufacturing processes previously described, the surface of the cylindrical shell 72 is smooth and continuous and meets a primary requirement of such homopolar generator machines. It is imperative that the rotor surface, at least under the current collection zones, be smooth since these zones are used exclusively for current collection with, for example, solid metal-graphite brushes which contact the rotor surface. Any surface roughness or discontinuity would cause instant damage to the brushes and disrupt proper operation of the machine.

In an ideal operation of the homopolar generator FIG. 3, the magnetic flux produced by the field coils exits the stator structure 44 and enters the rotor in a radial direction, traverses the rotor in an axial direction under the current collection brush assembly and returns to the stator structure in an axial direction. In actuality however, in a practical machine with significant air gaps, magnetic saturation of the core material or stator structure will cause an amount of leakage flux to typically pass from the stator structure across the air gap at a non-radial angle and enter the rotor magnetic circuit through the current collection zone. This leakage flux causes an additional voltage to be generated in the current collection zone over the entire length of the current collection brush assemblies. This leads to a consequent current flow that circulates through the brush assemblies and may cause their premature failure Accordingly, such homopolar generators are designed to compensate in some manner for the leakage flux.

One typical method of leakage flux compensation is with the provision of auxiliary coils utilized to produce a compensating flux which nulls the leakage flux. With the present invention, the rotor of the homopolar generator may be manufactured to provide for a self-compensating magnetic field which can offset the objectionable flux leakage in the conventional homopolar generator and to this end reference is made to FIG. 5.

Figure 5:
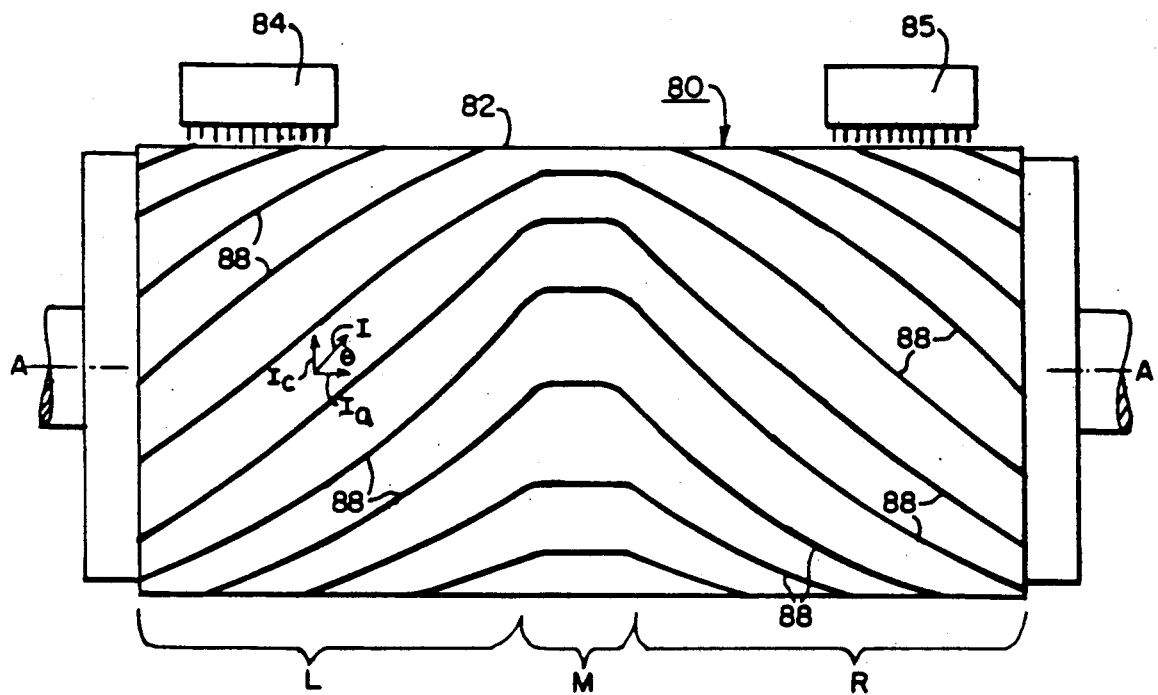
FIG. 5 illustrates another type of rotor arrangement which may be utilized in the homopolar generator of FIG. 4.

FIG. 5 illustrates a homopolar generator rotor 80 having a highly conductive cylindrical shell 82 which delivers current to a plurality of current collection brush assemblies, two of which 84 and 85 are illustrated.

The cylindrical shell 82 is fabricated in accordance with one of the techniques illustrated herein whereby multiple passes are made with a high energy beam to form a plurality of alloyed zones 88 which exhibit a higher resistivity to current flow than the remainder of the shell. The multiple passes with the high energy beam is such as to form a spiral pattern in the left portion of the rotor marked with the letter L as well as a spiral pattern in the right portion of the rotor marked with the letter R. The two spiral patterns meet in the middle of the rotor designated by the letter M, such zone M being normally under the output terminal area of the machine.

With such spiral pattern, the current through the shell is primarily directed at an angle $\theta$ relative to the machine axis AA. By way of example, in FIG. 5, the left hand section illustrates the current direction by the vector I at an angle $\theta$ with respect to the machine axis AA. The current I may be thought of as having both an axial component $I_a$ and a circumferential component $I_c$. It is this circumferential component of the current which produces the self-compensating magnetic field which functions to reduce the flux leakage in the current collection area to thereby reduce unwanted circulating currents. The arrangement of FIG. 5 additionally minimizes large unwanted eddy currents as previously discussed with the self-compensation and eddy current minimization being achieved without compromising the absolute requirement for rotor smoothness needed for proper operation and prolonged life of the machine.

Figure 6:
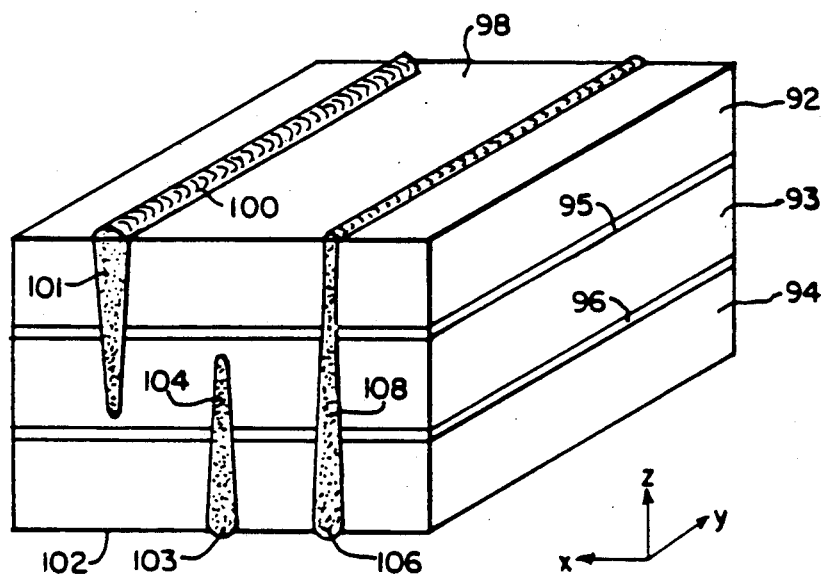
FIG. 6 illustrates an anisotropic resistivity body in accordance with another aspect of the present invention.

The manufacturing techniques described herein lend themselves to the fabrication of complex conductor designs for high current applications. By way of example, FIG. 6 illustrates an anisotropic resistivity body wherein the resistivity may be varied in three dimensions. By way of example, in FIG. 6, three base members 92, 93, and 94 are provided and they are separated by intermediate metallic layers 95 and 96. Different variations of alloyed zones are possible by making multiple passes with a high energy beam at different energy level settings and directed toward the top surface of base member 92 and the bottom surface of base member 94. More particularly, a first pass over surface 98 with a lower energy beam, the pass being represented by the numeral 100, results in a beam penetration through base members 92 and 93 such that a zone 101 is produced which is an alloy of layer 95 and base members 92 and 93. If base members 92, 93 and 94 are all of the same metal, for example copper, metal layers 95 and 96 may be of different metals such as nickel and aluminum respectively, in which case alloyed zone 101 would be a nickel copper alloy. Another pass, directed so as to pass from surface 102 toward surface 98 and represented by numeral 103, results in an alloyed zone 104 of aluminum-copper. A third pass with a higher energy level setting and directed from surface 102 toward surface 98 so as to pass through all three base members, and represented by numeral 106, results in an alloyed zone 108 of nickel-aluminum-copper.

What is claimed is:
1. A rotor for a dynamoelectric machine comprising:
   A) a rotor core for rotation about a longitudinal axis;
   B) an electrically conductive shell surrounding and placed onto said core;
   C) said shell having a smooth continuous outer surface;
   D) said shell having defined therein a plurality of zones which exhibit a higher resistivity than the remainder of said shell <said zones being arranged to minimize unwanted large eddy currents during operation of said dynamoelectric machine.
2. A body according to claim 1 wherein:
   A) said zones of higher resistivity extend parallel to said longitudinal axis.
3. A body according to claim 1 wherein:
   A) said zones of higher resistivity are generally spirally arranged over portions of said shell.

* * * * *